United States Patent [19]

Leshkowitz

[11] 4,176,320
[45] Nov. 27, 1979

[54] TRANSMISSION TRUNK POWERING SYSTEM

[76] Inventor: Victor Leshkowitz, 6 Airway Dr., Bellmore, N.Y.

[21] Appl. No.: 946,719

[22] Filed: Sep. 28, 1978

[51] Int. Cl.² .............................................. H04N 7/10
[52] U.S. Cl. ................................. 325/308; 179/170 J
[58] Field of Search .................... 325/308; 179/170 J; 307/23, 29, 36, 64, 65, 69, 125, 126, 140; 330/297; 340/310 R

[56] References Cited

U.S. PATENT DOCUMENTS

| | | | |
|---|---|---|---|
| 2,504,692 | 4/1950 | Jacobs | 179/170 J |
| 2,785,317 | 2/1957 | Langberg et al. | 307/64 |
| 3,061,736 | 10/1962 | Devine | 307/64 |
| 3,435,358 | 3/1969 | Rheinfelder | 325/308 |
| 3,612,894 | 10/1971 | Schmidt | 307/64 |
| 3,860,748 | 1/1975 | Everhart et al. | 340/310 R |
| 3,909,560 | 9/1975 | Martin et al. | 179/170 J |

OTHER PUBLICATIONS

Jerrold Electronics Corp., "Instruction Sheet 435-551-01", Power Combiner.

Primary Examiner—Marc E. Bookbinder
Assistant Examiner—Alexander Gerasimow
Attorney, Agent, or Firm—Jack D. Slobod

[57] ABSTRACT

An r.f. signal transmission line system in which a plurality of spaced apart A.C. power sources are respectively coupled by power combiners to a plurality of sequential segments of the transmission line for powering a group of spaced apart thru-powered r.f. signal amplifiers in series with each segment. Each power combiner includes a switching circuit for automatically disconnecting the source from the line segment in the event of failure of the source. Associated with stop-powered amplifiers between adjoining segments is an automatic switching circuit which converts the stop powered amplifier to thru powering in the event of loss of power to a line segment on either side of the stop-powered amplifier and which restores the amplifier to stop-powering upon restoration of the lost power.

9 Claims, 2 Drawing Figures

TRANSMISSION TRUNK POWERING SYSTEM

FIELD OF THE INVENTION

The present invention relates to a radio frequency signal transmission line system in which the signal amplifiers associated with each sequential segment of the line are powered from a different associated power source coupled to each line segment. In its particular aspects the present invention relates to the provision of automatic switch means at the junctions between adjoining line segments to permit power flow between a segment or segments which have power and a segment on which an associated power supply has failed.

BACKGROUND OF THE INVENTION

Present cable television systems utilize an r.f. transmission line with a plurality of amplifiers which are provided spaced apart along and in series with the line to feed distribution amplifiers and to maintain useable levels of signal along the line by compensating for transmission losses. Generally, the loss of amplification at any location will interdict the signal downline therefrom. The combination of the transmission line and amplifiers shall be termed a transmission line trunk. These amplifiers are configured to receive power from the line which is impressed upon the line by a plurality of spaced apart A.C. power sources coupled thereto. Each source is associated with the amplifiers of a different segment of the line or trunk, and filter means, such as stop-powered amplifiers, are located at the junctions between adjoining segments to prevent power flow therebetween. Consequently, in the event of loss of power at any particular power source and associated segment, all locations on that segment and downline therefrom are without useable signal resulting in considerable inconvenience to the cable t.v. subscribers until the power source is repaired.

OBJECTS OF THE INVENTION

It is an object of the present invention to provide in an r.f. transmission line trunk of the type in which different trunk segments are separately powered, the improvement of switching means located at each junction between adjoining segments for automatically providing a power path between adjoining segments in response to loss of power on either of said adjoining segments.

It is a further object of the present invention to provide inherent in said switching means, means for automatically opening said power path in response to restoration of lost power on the segment adjoining said switching means.

It is yet another object of the present invention to provide associated with means for coupling a power source with an associated line segment, means for automatically disconnecting said power source from said segment in the event of power failure.

It is yet another object of the present invention to provide, associated with the means for coupling a power source with an associated line segment, means for automatically disconnecting said power source and automatically bisecting said segment powerwise in the event of power failure to permit powering of different halves of said segment respectively from the trunk segments on either side of said segment.

SUMMARY OF THE INVENTION

Briefly, the aforementioned and other objects of the present invention are satisfied by providing at the junctions between separately powered transmission trunk segments, automatic switch means for providing a power path between adjoining segments in the event of power loss on either segment. The switch means includes a first relay means which is normally connected to have its coil energized through its own contacts only when power is present on the trunk segments on both sides of the switch means. The power path is established through the relay's contacts when the relay coil becomes unenergized. For sensing when power is restored, a thermal breaker is in series with the power path which opens upon restoration of power. A second relay whose coil is energized by the appearance of voltage across the thermal breaker, provides a means to reenergize the coil of the first relay to allow it to latch through its own contacts.

A further feature of the invention is the provision of switch means associated with power combiners for coupling power sources to the associated trunk segments. The switch means is configured to automatically disconnect the power source from the associated trunk segment upon failure of the power source. For bisecting each interior trunk segment, to allow each trunk segment half to be separately powered from adjoining segments, the power combiner includes a filter means in series with the segment which is configured to pass r.f. signal but not to pass power and the switch means is configured to automatically connect or disconnect the power source from both sides of the filter element.

Other objects, features and advantages of the present invention will come apparent upon perusal of the following detailed description of a preferred embodiment thereof when taken in conjunction with appended drawing wherein.

DETAILED DESCRIPTION OF THE PREFERRED EMBODIMENT

In the detailed description various terms shall be used which are somewhat unique to the cable television field. Consequently, the following glossary of terms is provided:

amplifier; thru powered—a trunk amplifier which receives power from the trunk and which has associated filter circuitry to continually provide a power path in parallel with the amplifier.

amplifier; stop powered—a trunk amplifier which receives power from the trunk on either the input side or output side of the amplifier and which has associated filter circuitry to block power flow in parallel with the amplifier.

amplifier, powered out—a stop powered amplifier which receives power from the output side of the amplifier.

amplifier, powered in—a stop powered amplifier which receives power from the input side of the amplifier.

power combiner—a device for coupling power to a trunk segment.

Figure 1:
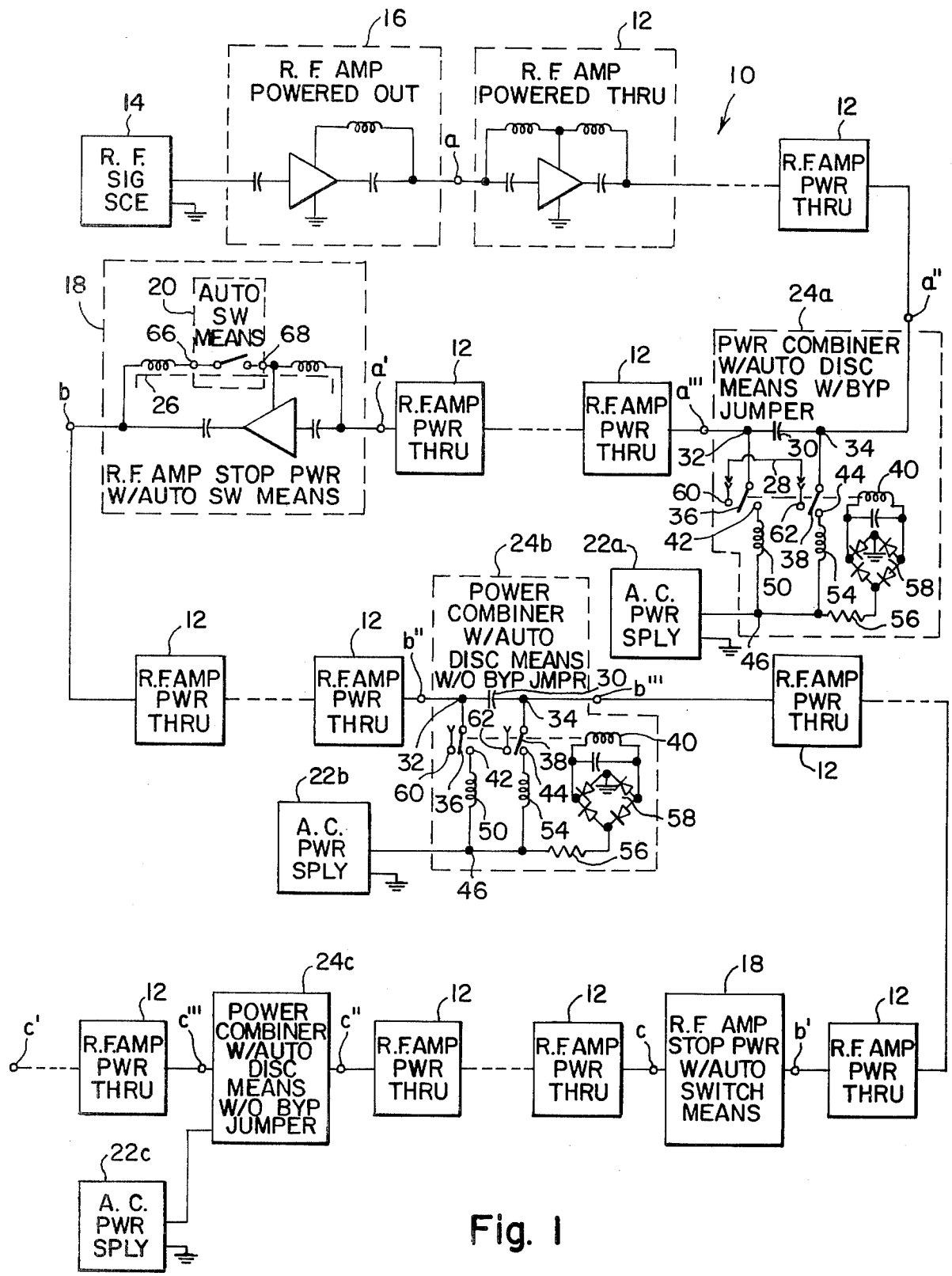
FIG. 1 is a schematic representation of the transmission trunk powering system according to the present invention.

Further, as regards FIG. 1, while more complex filter elements may be provided, a capacitor symbol is intended to represent an r.f. signal passing, power blocking element and a choke symbol the converse.

Now referring to FIG. 1, there is shown a cable television r.f. signal transmission line, trunk 10 composed of a plurality of sequential trunk segments aa', bb' and cc'. There are disposed along each trunk segment in series with the segment, a plurality of spaced apart r.f. amplifiers 12 in a thru-powering configuration for maintaining the signal level along trunk 10 from an r.f. signal source 14. Source 14, drives the input end of segment aa' via an amplifier 16 in "powered-out" configuration. Similarly the last amplifier on trunk 10 (not shown) is in a "powered-in" configuration. At the junction between segments aa' and bb' and at the junction between segments bb' and cc' are stop powered amplifiers 18 which include an automatic switch means 20 for converting the stop powered amplifier to a thru powered amplifier upon a loss of power on either of the segments adjoining amplifier 10. The operation of switch means 20, which is more fully detailed in FIG. 2, will be understood later in the discussion.

A.C. power supplies 22a, 22b and 22c (typically 60 volts, 60 Hertz), are respectively coupled to points intermediate and approximately at the center of trunk segments aa', bb' and cc ∝ by power combiners 24a, 24b and 24c to respectively impress power on these segments for the amplifiers associated therewith.

As should now be apparent the segments aa', bb' and cc' are normally individually powered by the power sources 22a, 22b and 22c, since the normally stop-powered amplifier 18 effectively acts as filter means for passing r.f. signal between adjoining segments and blocking power flow therebetween. Consequently, upon a failure of one of sources 22a, 22b and 22c the amplifiers of the associated segment will become inactive and signal will be lost downline resulting in interruption of service to subscribers.

According to the principles of the present invention, the automatic switch means 20 associated with the stop powered amplifiers 18 adjoining the segment which has lost power closes to enable power flow into that segment immediately upon loss of power. This power flow occurs in a path 26 in parallel with the amplifier 18; switch means 20 is in series with said path.

In order to more fully understand the nature of the flow of power in normal circumstances and in the event of power failure the operation of the power combiners 24a, 24b and 24c will now be detailed. Power combiners 24b and 24c associated with interior power supplies are identical to each other while power combiner 24a associated with the first supply 22a (and one associated with the last source on the line—not shown) are identical to the others except that they include an additional bypass jumper 28 whose function will become clear as the discussion proceeds. Each power combiner has a capacitor 30 in series with the associated power line segment for permitting flow of r.f. signal along the segment while blocking the flow of power therethrough, in order to isolate each line segment powerwise into two half segments.

The three line segments aa', bb' and cc' are thereby divided into the following six half segments:

aa", a'''a', bb", b'''b', c, c" and c'''c'. On either side of each capacitor 30 there are terminals 32, 34 which are respectively connected to the wipers 36, 38 of a double-pole-double-throw D.C. relay having the associated relay coil 40. Contacts 42, 44 which are respectively engaged by wipers 36, 38 when coil 40 is energized, are respectively coupled to the output terminal 46 of the associated A.C. power supply 22 by means of chokes 50 and 54. The output terminal is connected to coil 40 via a resistor 56 which feeds a full wave rectifier bridge 58 which in turn drives the coil 40. Consequently coil 40 is energized only when power is present at the output of the associated power supply. Under those circumstances, power from the associated power supply 22 flows in two separate paths respectively through chokes 50, 54 via the closed contacts 36, 42 and 38, 44 to the points 32, 34 to separately feed the half segments of each associated line segment. The contacts 60, 62 which are respectively engaged by wipers 36, 38 when coil 40 becomes unenergized because of failure of the associated power supply 22, are connected together by jumper 28 in the case of power combiner 24a and are connected to nothing in the case power combiners 24a and 24b. Consequently, in the event of the failure of power supply 22a, supply 22a is uncoupled from segment aa' and the half segments aa" and a'''a' become coupled together powerwise through jumper 28, while in the event of failure of power supply 22b, supply 22b becomes uncoupled from segment bb' and half segments bb" and b'''b' remain uncoupled powerwise.

The operation of the entire powering system can now be understood. In the event of failure of power supply 22a, the disconnect switch means of power combiner 24a operates to disconnect supply 22a from segment aa' and to powerwise couple together half segments aa" and a'''a'. At the same time switch means 20 of the stop-powered amplifier 18 between segments aa' and bb' closes automatically to establish the power path 26 to enable the entire first semgnet aa' to be powered from the supply 22b of segment bb'. In the event of failure of an interior supply such as supply 22b, the disconnect means associated with power combiner 24b uncouples supply 22b from segment bb' leaving that segment bisected powerwise. Then the switch means 20 associated with the stop powered amplifiers 18 between segments aa' and bb' and between the segments bb' and cc' close automatically to enable the half segment bb" to receive power from supply 22a and the half segment b'''b' to receive power from supply 22c.

Figure 2:
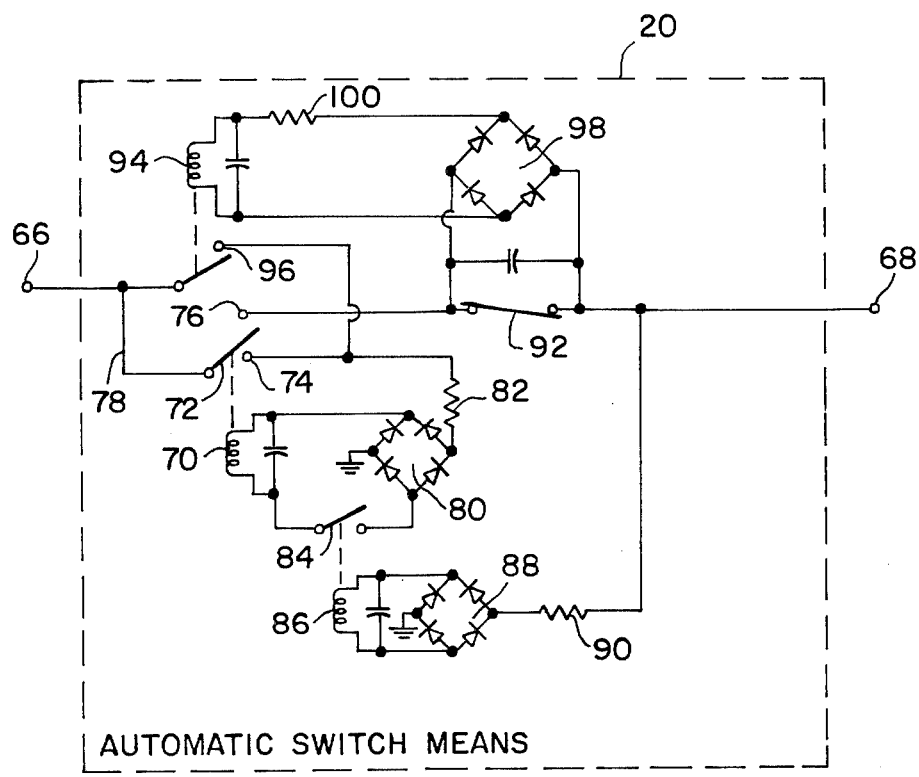
FIG. 2 is a detailed schematic representation of an automatic switch means forming a portion of FIG. 1.

Automatic switch means 20 is more fully detailed in FIG. 2 and includes the terminals 66, 68 which are normally respectively energized by the power supplies of the line segments on either side of the switch means. Switch means 20 further includes a first d.c. relay having the coil 70 and single-pole-double-throw wiper 72 which engages contact 74 when the coil is energized and which engages the contact 76 when the coil is not energized. Wiper 72 is connected to terminal 66 by lead 78 and contact 74 is coupled to a full wave rectifier bridge 80 via a resistor 82. The d.c. output of rectifier bridge 80 is in series with the coil 70 and with the contact set 84 of a second d.c. relay having the coil 86. Terminal 68 is coupled to the input of a second bridge rectifier 88 via a resistor 90. Relay 86 is energized under the normal circumstances when power supply voltage is present at terminal 68 which energization causes contact set 84 to be closed. Consequently, should power also be present at terminal 66, and if some action were taken to momentarily energize relay coil 70, coil 70 would remain energized because of a latch action through the engagement of contact 74 by wiper 72 and the resultant completion of a power path to coil 70. Therefore the first relay will remain latched in an energized state as long as there is power at both terminals 66 and 68.

Contact 76, associated with first relay is coupled to terminal 68 via self resetting thermal breaker 92. Thus, when the first relay is unenergized, a power path between terminals 66 and 68 is formed through the series combination of wiper 72, contact 76 and thermal breaker 92.

A third d.c. relay having the coil 94 includes a contact set 96 which is parallel with the contact set of the first relay comprising the wiper 72 and contact 74. The voltage across the thermal breaker 92 is applied to the input of a third full wave rectifier bridge 98 whose output drives coil 94 in series with a resistor 100.

Referring again to FIG. 1, adjacent ones of the A.C. power supplies 22 are adjusted to be normally substantially out of phase with each other. For example, the voltages of supplies 22a and 22c are adjusted to be approximately in phase with each other and 180 degrees out of phase with the voltage of supply 22b. Consequently, in the event that voltage is present from different supplies at terminals 66 and 68 a relatively high current will flow through breaker 92 causing it to open and a voltage to be developed across the breaker. This voltage energizes coil 94 via bridge 98 and resistor 100 causing contact set 96 to close which in turn energizes coil 70 of the first relay allowing it to latch through wiper 72 and contact 74.

Thus, under normal conditions relay coil 70 is energized. Upon loss of voltage at either terminal 66 or terminal 68 the coil 70 becomes unenergized completing a power path through switch means 20 via wiper 72 and contact 76 and thermal breaker 92. Upon restoration of the lost voltage, coil 94 responsive to the voltage across thermal breaker 92, provides a means to automatically reopen the wiper 72, contact 76 switch means. Thereafter, upon cooling, breaker 92 closes.

While the preferred embodiment of the present invention has been described in particular detail, numerous modifications, additions and omissions are possible within the intended spirit and scope of the invention.

What is claimed is:

1. In a system for conveying a relatively high frequency signal along an elongated section of transmission line, said line comprising a plurality of sequential line segments, a different group of signal amplifiers associated with each line segment being disposed in series with said segment in spaced apart relationship along said segment for maintaining the level of signal to compensate for losses along said segment; a different source of relatively low frequency power associated with each line segment; a different power combiner means associated with each line segment coupling said power source associated with said segment to a point intermediate said line segment for impressing power on said segment; each of the amplifiers of said group being coupled to said segment in a manner for receiving power therefrom and allowing power to flow in parallel with said amplifier and first filter means in series between adjoining segments configured to pass said signal and to block flow of power therebetween; the improvement comprising: first automatic switch means associated with said first filter means for providing a power path between said adjoining line segments in response to the loss of power on either said adjoining segments.

2. The improvement of claim 1 further comprising automatic means associated with said first switch means and responsive to the current through said power path for automatically opening said first switch means upon restoration of the lost power.

3. The improvement of claim 1 further comprising second automatic switch means associated with each power combiner means for disconnecting said associated power source from said associated line segment in response to failure of said associated power service.

4. The improvement of claim 2 further comprising second automatic switch means associated with each power combiner means for disconnecting said associated power source from said associated line segment in response to failure of said associated power service.

5. The improvement of claim 3 wherein said power combiner means comprises a second filter means in series with said associated segment at said intermediate point for passing signal and blocking power flow, and wherein said second switch means comprises means for respectively coupling each side of said second filter means to said associated power source only when said associated power source is active.

6. The improvement of claim 4 wherein said power combiner means comprises a second filter means in series with said associated segment at said intermediate point for passing signal and blocking power flow, and wherein said second switch means comprises means for respectively coupling each side of said second filter means to said associated power source only when said associated power source is active.

7. The improvement of claim 2 wherein said current responsive means includes a thermal breaker within said power path and means responsive to the voltage across said thermal breaker for controlling said first switch means.

8. The improvement of claim 3 wherein said current responsive means includes a thermal breaker within said power path and means responsive to the voltage across said thermal breaker for controlling said first switch means.

9. The improvement of claim 5 wherein said current responsive means includes a thermal breaker within said power path and means responsive to the voltage across said thermal breaker for controlling said first switch means.

* * * * *